(12) United States Patent
Schmid

(10) Patent No.: US 6,715,595 B2
(45) Date of Patent: Apr. 6, 2004

(54) TORSIONAL VIBRATION DAMPER

(75) Inventor: Herbert Schmid, Münnerstadt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/760,170

(22) Filed: Jan. 12, 2001

(65) Prior Publication Data

US 2001/0007383 A1 Jul. 12, 2001

(30) Foreign Application Priority Data

Jan. 12, 2000 (DE) .......................... 100 00 899

(51) Int. Cl.⁷ .................. F16D 33/00; F16D 3/14
(52) U.S. Cl. ......................... 192/3.28; 192/212
(58) Field of Search .................. 192/3.29, 3.3, 192/3.28, 55.61, 212

(56) References Cited

U.S. PATENT DOCUMENTS

| | | | | |
|---|---|---|---|---|
| 4,232,765 A | * | 11/1980 | Rupprecht | 188/78 |
| 4,924,978 A | * | 5/1990 | Ohkubo | 192/106 F |
| 5,215,173 A | * | 6/1993 | Gimmler | 192/3.29 |
| 5,390,757 A | * | 2/1995 | Smith | 180/227 |
| 5,400,884 A | * | 3/1995 | Matsuoka | 192/113.34 |
| 5,575,364 A | * | 11/1996 | Friedmann et al. | 192/201 |
| 5,704,456 A | * | 1/1998 | Hinkel | 192/113.32 |
| 5,975,261 A | * | 11/1999 | Woerner et al. | 192/212 |
| 6,012,558 A | * | 1/2000 | Kundermann | 192/3.28 |
| 6,142,272 A | * | 11/2000 | Meisner et al. | 192/212 |

FOREIGN PATENT DOCUMENTS

| | | | | |
|---|---|---|---|---|
| DE | 197 24 973 | | 10/1998 | F16H/45/02 |
| WO | WO-9910663 A1 | * | 3/1999 | |

* cited by examiner

*Primary Examiner*—Jack Lavinder
*Assistant Examiner*—Melody M. Burch
(74) *Attorney, Agent, or Firm*—Cohen, Pontani, Lieberman & Pavane

(57) ABSTRACT

A torsional vibration damper for a hydrodynamic clutch device particularly for coupling a turbine wheel hub with a turbine wheel shell and/or for coupling a lockup clutch arrangement with a turbine wheel, includes a primary side and a secondary side which is rotatable about an axis of rotation with respect to the primary side against the action of a damper element arrangement. A radial bearing arrangement is arranged for radially supporting the primary side and secondary side with respect to one another. For this purpose, the radial bearing arrangement is arranged radially outside of the damper element arrangement.

24 Claims, 6 Drawing Sheets

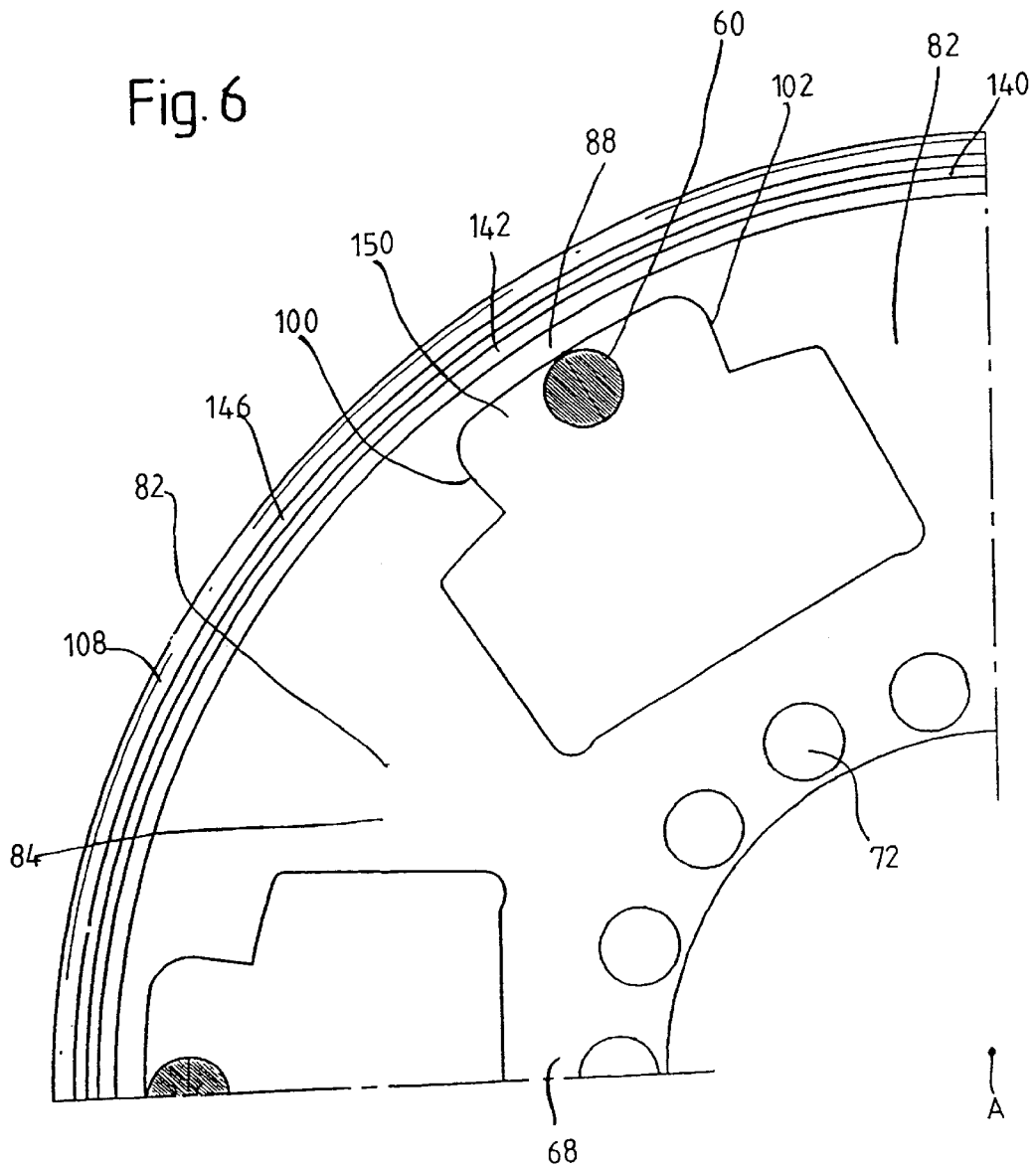

TORSIONAL VIBRATION DAMPER

BACKGROUND OF THE INVENTION

1. Field of the Invention

The present invention relates to a torsional vibration damper for coupling a turbine wheel hub with a turbine wheel shell in a hydrodynamic clutch device and/or for coupling a lockup clutch arrangement with a turbine wheel, the torsional vibration damper including a primary side and a secondary side which is rotatable about an axis of rotation with respect to the primary side against the action of a damper element arrangement, and a radial bearing arrangement for supporting the primary side and secondary side with respect to one another in radial direction.

2. Description of the Related Art

German reference DE 197 24 973 C1 discloses a torsional vibration damper in which the primary side and the secondary side of the torsional vibration damper comprise various subassemblies of a turbine wheel hub. That is, a first subassembly part of the turbine wheel hub, which is associated with the turbine wheel shell with respect to rotary operation since it is fixedly connected therewith, is connected with one of the primary and secondary side so as to be fixed with respect to rotation relative to it, and a second subassembly part of the turbine wheel hub is connected with the other side of the primary and secondary side so as to be fixed with respect to rotation relative to it or is constructed integral therewith. These two subassemblies or structural component parts are supported against one another in the radial direction by a radial bearing arrangement. Accordingly, the primary side and the secondary side of the torsional vibration damper with which these individual parts or subassemblies are associated are also supported with respect to one another in this way in radial direction by this radial bearing arrangement. The radial bearing is located in an area close to the axis of rotation. Due to the small radial distance from the axis of rotation, the bearing surface of the respective subassembly available for bearing support is very limited. The bearing surface of the respective subassembly is further limited by the axial extension.

In torsional vibration dampers of this kind, the relative rotation between the primary side and the secondary side of the torsional vibration dampers and the subassemblies which are supported against is in a small angular area of rotation with high frequencies with respect to one another. However, this results in a relatively small surface region of the surfaces or components used for mutual radial bearing support being passed over. In torsional damping operation, a very highly concentrated load occurs in this region or in these regions.

SUMMARY OF THE INVENTION

It is the object of the present invention to provide a torsional vibration damper having a primary side and a secondary side arranged so that the load occurring in vibration damping operation is reduced in a region used for radial bearing support between the primary side and the secondary side.

The object is met according to an embodiment of the present invention by a torsional vibration damper for coupling a turbine wheel hub with a turbine wheel shell and/or for coupling a lockup clutch arrangement with a turbine wheel in hydrodynamic clutch device. The torsional vibration damper includes a primary side and a secondary side which is rotatable about an axis of rotation with respect to the primary side against the action of a damper element arrangement. The torsional vibration element further comprises a radial bearing arrangement for supporting the primary side and secondary side with respect to one another in radial direction.

Furthermore, the radial bearing arrangement is arranged radially outside of the damper element arrangement.

Accordingly, the solution adopted by the present invention is to locate the radial bearing arrangement radially outward from the region utilized in the prior art, so that an appreciably greater surface region is provided for mutual support due to the larger radial distance from the axis of rotation with the same relative rotational angle between the primary side and secondary side. Consequently, the load concentration which occurs in the prior art is reduced and excessive wear in the region of the subassemblies used for mutual radial bearing support of the primary side and secondary side may be prevented.

A radial bearing arrangement which operates with particularly low wear may be achieved in that the radial bearing arrangement includes a plurality of bearing roller elements rotatably arranged at one side of the primary side and secondary side. The other side of the primary side and secondary side is movable relative to the one side and a plural bearing roller elements via a bearing surface.

In this embodiment, at least one bearing roller element is preferably mounted so as to be rotatable with respect to the one side of the primary side and secondary side via at least one bearing body. The at least one bearing body may be a sliding bearing body constructed as a sliding bearing sleeve supported at a bearing journal of the one side of the primary side and secondary side and on which a respective bearing roller element is supported.

In an alternative embodiment, at least one bearing roller element is mounted at a bearing journal of one side of the primary side and secondary side by a plurality of rolling bodies such as, for example, balls.

Another alternative embodiment of a torsional vibration damper according to the invention includes a plurality of sliding bearing elements arranged at one side of the primary side and secondary side. The other side of the primary side and secondary side is movable at these sliding bearing elements via a bearing surface.

To ensure that the primary side and the secondary side are movable with respect to one another only in a limited angle of relative rotation without excessive loading of the damper element arrangement, a circumferential movement stop is provided for a respective bearing roller element or sliding bearing element in at least one circumferential area when a bearing surface is associated with the respective bearing roller element or sliding bearing element.

The construction of a torsional vibration damper according to the invention is simplified by integration of functions or subassemblies in that a respective bearing surface is provided at a radial outer region of a supporting area serving to support the damper element arrangement at the other side of the primary side and secondary side.

In another alternative embodiment of the torsional vibration damper according to the present invention, the radial bearing arrangement comprises a bearing member which encloses the axis of rotation annularly and acts at a respective bearing surface of the primary side and secondary side. The bearing member preferably comprises a sliding bearing sleeve.

In an embodiment of the torsional vibration damper according to the present invention which is especially suited to torque transmission in the circumferential direction, the primary side includes two cover disk elements arranged at an axial distance from one another and fixedly connected with one another and the secondary side includes a central disk element arranged between the two cover disk elements.

To achieve an integration of functions or subassemblies in this case also and to simplify the construction as much as possible, the at least one bearing roller element or the at least one sliding bearing element is supported at a connection element connecting the cover disk elements with one another.

The turbine wheel shell of the hydrodynamic clutch device may be connected to a radially inner region of at least one of the cover disk elements. The turbine wheel hub of the hydrodynamic clutch device may then be connected with the central disk element. Furthermore, the turbine wheel hub may form one part with the central disk element.

Further, a clutch element of a lockup clutch of the hydrodynamic clutch device may be connected with the primary side of the torsional vibration damper. The clutch element may comprise a plate carrier and may be held at the primary side via connection elements.

The present invention is further directed to a hydrodynamic clutch device such as a hydrodynamic torque converter or a fluid coupling with a torsional vibration damper according to the present invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 6 is a partial axial view of a part of the torsional vibration damper shown in FIG. 5.

DETAILED DESCRIPTION OF THE PRESENTLY PREFERRED EMBODIMENTS

Figure 1:
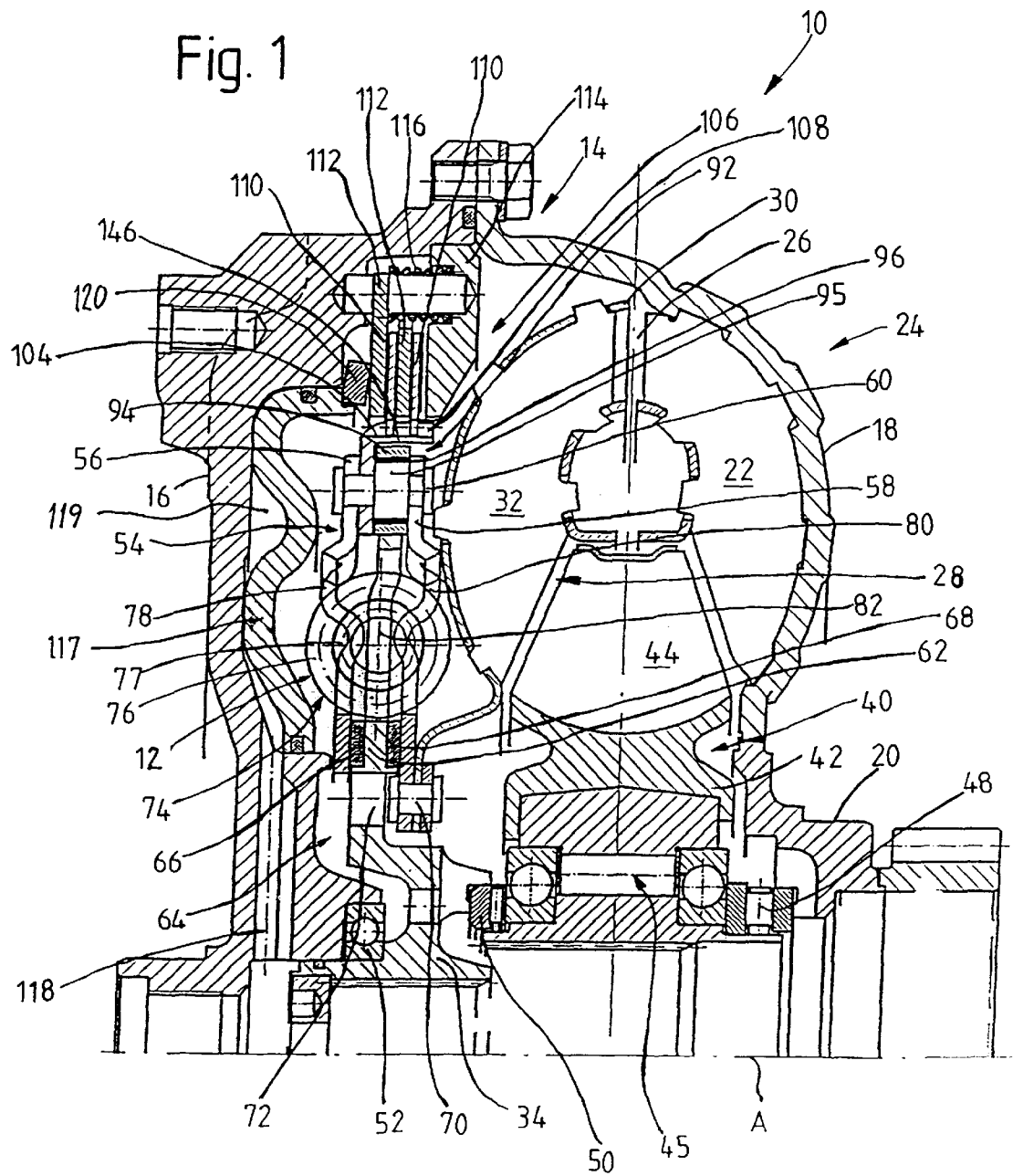
FIG. 1 is a partial longitudinal sectional view through a hydrodynamic clutch device constructed as a torque converter including a torsional vibration damper according to an embodiment of the present invention.

FIG. 1 is a sectional view of a hydrodynamic torque converter 10 including a torsional vibration damper 12 according to the present invention. The torque converter 10 comprises a housing 14 which includes a housing cover 16 and an impeller wheel shell 18. A radial outer side of the impeller wheel shell 18 is connected with the housing cover 16. A radial inner side of the impeller wheel shell 18 is connected with an impeller wheel hub 20. Further, a plurality of impeller wheel blades 22 are connected at an inner side of the impeller wheel shell 18. The impeller wheel hub 20, the impeller wheel shell 18, and the impeller wheel blades 22 together form an impeller wheel 24. A turbine wheel 28 is arranged in an interior 26 of the torque converter 10. The turbine wheel 28 has a turbine wheel shell 30 with a plurality of turbine wheel blades 32 on a side of the turbine wheel 28 facing the impeller wheel 24. The turbine wheel 28 further comprises a turbine wheel hub 34 which is connectable by an axial toothing to a driven shaft, not shown, of the torque converter 10 so that the turbine wheel hub 34 is fixed with respect to rotation relative to the driven shaft. The turbine wheel shell 30 and the turbine wheel hub 34 are connected for rotation via a torsional vibration damper 12 which will be described in more detail below.

A stator wheel 40 having a plurality of stator wheel blades 44 arranged successively in circumferential direction is located axially between the turbine wheel 28 and the impeller wheel 24. An outer stator wheel ring 42 of the stator wheel 40 is supported via a freewheel on a supporting element, for example, a supporting hollow shaft, in such a way that it is essentially freely rotatable in one rotational direction about the axis of rotation A, but is fixed with respect to rotation in the other rotational direction. The stator wheel 40 is axially supported via respective bearing arrangements 48 and 50 at the impeller wheel 24 and at the turbine wheel 28. The turbine wheel 28 is axially and radially supported at the housing cover 16 via a bearing arrangement 52.

The torsional vibration damper 12 connected between the turbine wheel hub 34 and the turbine wheel shell 30 comprises a primary side 54 including two cover disk elements 56, 58 located at an axial distance from each other. The cover disk elements 56, 58 are fixedly connected with one another on a radial outer side by a plurality of connection bolts 60 such as, for example, rivet bolts. A secondary side 64 of the torsional vibration damper 10 comprises a central disk element 62 located axially between the two cover disk elements 56, 58. In the embodiment shown in FIG. 1, the central disk element 62 is constructed and an integral piece, i.e., as one piece, with the turbine wheel hub 34. However, the central disk element 62 may alternatively be fixedly connected with the turbine wheel hub via riveting, welding or other connection means. Sliding bearing rings 66 and 68 are respectively located between the cover disk elements 56, 58 and the central disk element 62 in the radial inner end area of the cover disk elements 56, 58. As shown in FIG. 1, the sliding bearing rings 66, 68 may be centered radially at the centering shoulders of the central disk element 62, so that they are rotatable relative to both the primary side 54 and the secondary side 64 of the torsional vibration damper 12. Alternatively, the two sliding bearing rings 66, 68 may also be fastened to the respective associated cover disk element 56, 58 or to the central disk element 62 by gluing, riveting or other mechanical connection. The primary side 54 is held and centered axially with respect to the secondary side 64 by the sliding bearing rings 66, 68. The radial inner end of the cover disk element 58 located nearest to the turbine wheel 28 is lengthened toward the radial inner side beyond the sliding bearing ring 68 and is fixedly connected with the radial inner end region of the turbine wheel shell 30 by rivet bolts 70. To produce this connection, the central disk element 64 has, in the circumferential area in which the rivet bolts 70 are to be positioned, through-openings 72 through which a tool may be guided.

The torsional vibration damper 12 further comprises a damper element arrangement 74 with a plurality of springs 76 or groups of such springs 76 arranged successively in circumferential direction in a manner known per se. One end of each of the springs 76 or groups of springs 76 is supported in circumferential direction at respective supporting areas 78, 80 of the cover disk elements 56, 58 and the other end is supported at supporting areas 82 of the central disk element 62. In other words, every spring 76 or group of springs 76 is positioned in such a way that it is tensioned in circumferential direction between two such supporting areas 78, 80 of the primary side 54 and the supporting area 82 of the second side 64. The supporting areas 78, 80 of the primary side 54 may be formed by axial deformation of the cover disk elements 56, 58 which may be cut out or shaped out at circumferential areas located between the supporting areas 78, 80 so as to accept the springs 76. The supporting areas 82 of the central disk element 62 are formed by supporting arms 84 (see FIG. 2) which project from a radial inner, continuous annular portion 86 of the central disk element 62. The radial outer sides of the supporting arms 84 are connected with one another via connection portions 88. Of course, the damper element arrangement 74 may also have springs 77 which are nested inside springs 76. The springs 76, 77 may, for example, be supported at the supporting areas 78, 80 and 82 via spring plates 90 or other supports.

Figure 2:
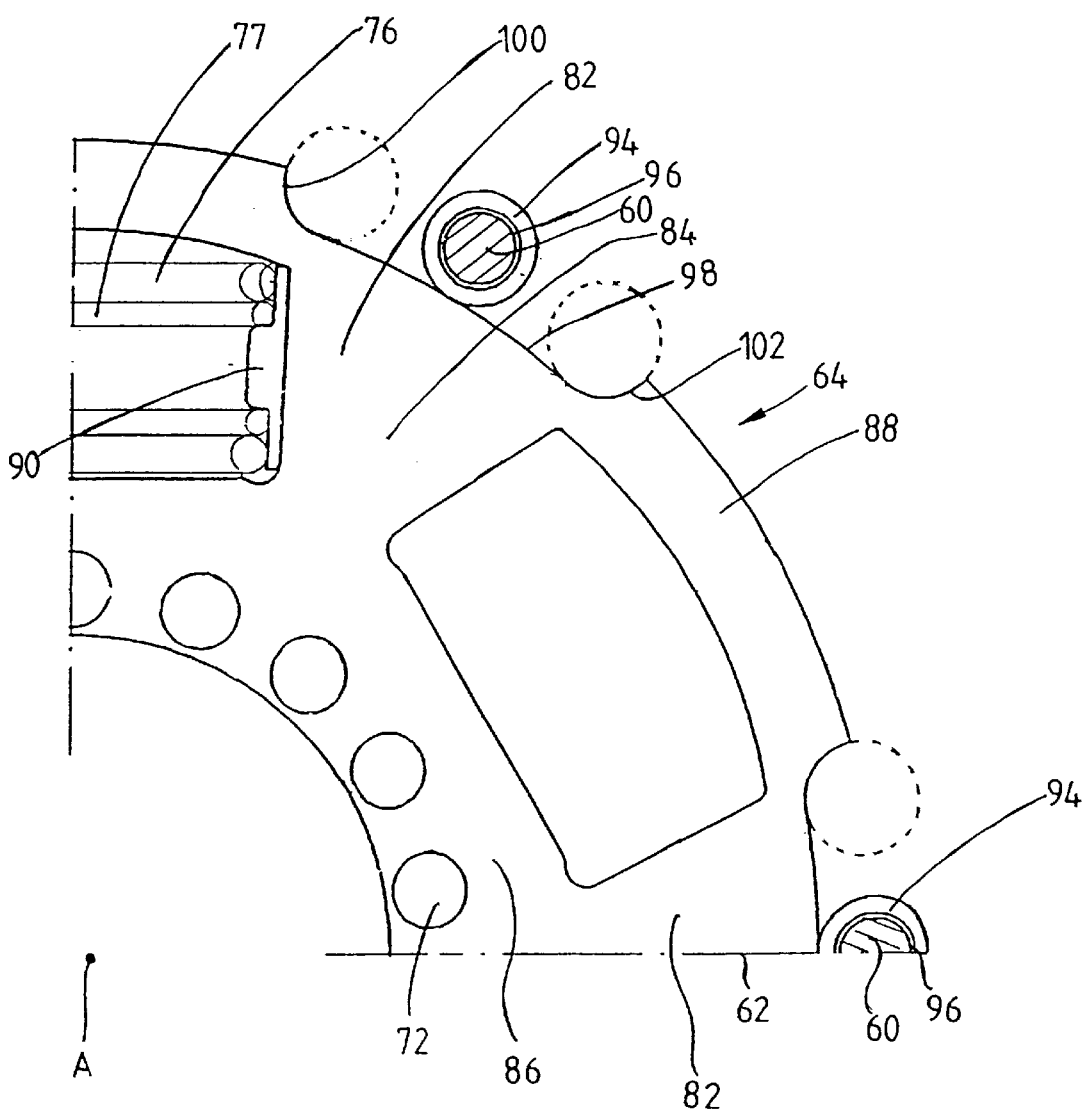
FIG. 2 is a partial axial view of a part of the torsional vibration damper of FIG. 1 showing the principle of operation of the torsional vibration damper in that the primary side and secondary side are supported with respect to one another.

A radial bearing arrangement 92 is arranged between the primary side 54 and the secondary side 64 for providing radial bearing support of the primary side 54 relative to the secondary side 64. FIGS. 1 and 2 show that the radial bearing arrangement 92 comprises a plurality of bearing roller elements 94 rotatably supported on a respective one of the connection bolts 60 with the intermediary of a sliding bearing sleeve 96, whereby the connection bolts 60 are bearing journals for the bearing roller elements 94. For this purpose, the connection bolts 60 have a portion 95 having a larger diameter than the remainder of the connection bolts and whose axial width corresponds approximately to the axial width of the sliding bearing sleeve 96 and/or bearing roller element 94. The central disk element 62 of the secondary side 64 has a bearing surface 98 associated with each of these bearing roller elements 94 on which the respective associated bearing roller element 94 rolls during relative rotation between the primary side 54 and secondary side 64. At least one of the bearing surfaces 98 is limited at both of its circumferential end areas by respective stop portions 100, 102 which are areas that project radially outward. The stop portions 100, 102 may, for example, be formed by the connection portions 88. These stop portions 100, 102 limit the rotational angle for the torsional vibration damper 12. In the absence of load on the torsional vibration damper, the primary side 54 and secondary side are positioned so that the bearing roller elements 94 are in the circumferential central area of the respective bearing surfaces 98, as is shown in FIG. 2. When the primary side 54 rotates relative to the secondary side 64 out of the position occupied by these two subassemblies with respect to one another in the absence of load, the bearing roller elements 94 come increasingly closer to and approach one of the stop portions 100, 102 as is indicated in dotted lines in FIG. 2 until the bearing roller elements 94 contact the one of the stop portions 100, 102 and are prevented from further movement. The primary side 54 and the secondary side 64 are then prevented from moving with respect to one another.

It is noted that bearing roller elements 94 with sliding bearing sleeves 96 supporting them need not necessarily be used in this embodiment. The sliding bearing sleeves 96 could also be supported directly on the associated bearing surfaces 98. In this alternative embodiment, the sliding bearing sleeves 96 are not required to be rotatable with respect to the primary side 54. Rather the sliding bearing sleeves may move in a sliding manner along the respective bearing surfaces 98. Sliding bearing blocks or other constructions of sliding bearing elements are also possible.

FIG. 1 further shows that an inner plate carrier 104 of a lockup clutch arrangement 106 is connected to the primary side 54 of the torsional vibration damper 12 via the connection bolts 60. Inner plates 110 are connected to the inner plate carrier 104 via a toothing 108 so that the inner plates 110 are fixed with respect to rotation relative to the inner plate carrier 104 and to allow axial movement of the inner plates 110 relative to the inner plate carrier 104. Respective outer plates 112 are held relative to the housing 14 so that the outer plates 112 are fixed with respect to rotation relative to the housing 14 axially movable relative to the housing. An abutment element 114 which is stationary with respect to the housing 14 is considered as another outer plate. As shown in FIG. 1, each of the inner plates 110 is arranged to lie between two outer plates 112, 114. Alternatively, each of the outer plates 112 could be arranged to lie between the two inner plates 110. A spring 116 is supported at the abutment element 114 such that the one of the outer plates 112 located at the furthest possible distance from the abutment element 114 is pretensioned by the spring 116 away from the abutment element 114.

A clutch piston 117 of the lockup clutch arrangement 106 is guided at the housing cover 16 so that it is axially movable but is sealed tight against fluid on the radial inner side and radial outer side. Fluid may be guided via a fluid channel arrangement 118 into a fluid space 119 formed between the housing cover 16 and the clutch piston 117, so that the clutch piston 117 is pressed away from the housing cover 16 against the pressure prevailing in the interior 26 of the torque converter 10. The outer plate 112 which is located closest to the housing cover 16 and is axially movable is pressed toward the abutment element 114 via a supporting element 120 when the clutch piston is moved away from the housing cover 16. The outer plates 112 and the inner plates 110 are then brought into frictional contact with one another to produce a lockup state. The outer plates 112 and/or the inner plates 110 may have friction facings.

The construction of the torsional vibration damper 12 according to the present invention arranges the bearing support of the primary side 54 with respect to the secondary side 64 in a radial outer region of these subassemblies. Therefore, even relatively small rotational movements of these two subassemblies with respect to one another result in a relatively large bearing surface region being passed over. This arrangement prevents point type overloading or wear in the region of the bearing surfaces 98 as well as in the region of the bearing roller elements 94. The construction according to the present invention in which the turbine wheel shell 30 is arranged in its radial inner area at one of the cover elements 56, 58 allows the use of conventional turbine wheel shells which would otherwise be riveted with a turbine wheel hub in the radial inner region of the turbine wheel shell. The arrangement of the inner plate carrier 104 connected to the primary side 54 such that it does not project axially over the torsional vibration damper 12 facilitates making the overall construction very small in axial direction. For this purpose, it is essential that the inner plate carrier 104 engages over the radial bearing arrangement 92 in axial direction by an essentially cylindrical portion 146 proceeding from its flange-like area connected to the primary side 54 and does not project over the remaining portion of the torsional vibration damper 12 in the axial direction.

Figure 3:
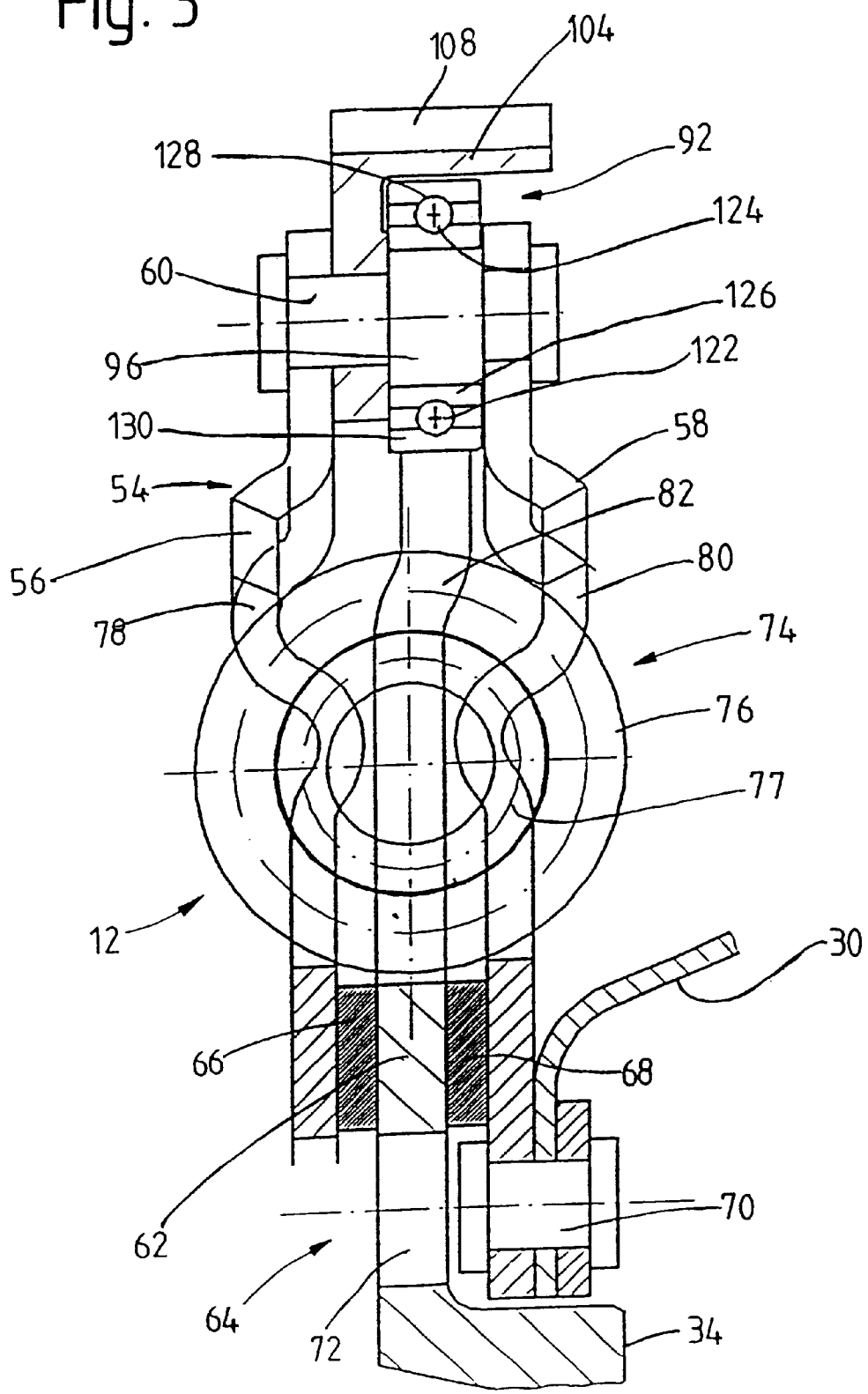
FIG. 3 is a partial longitudinal sectional view of a further embodiment of a torsional vibration damper according to the present invention.
Figure 4:
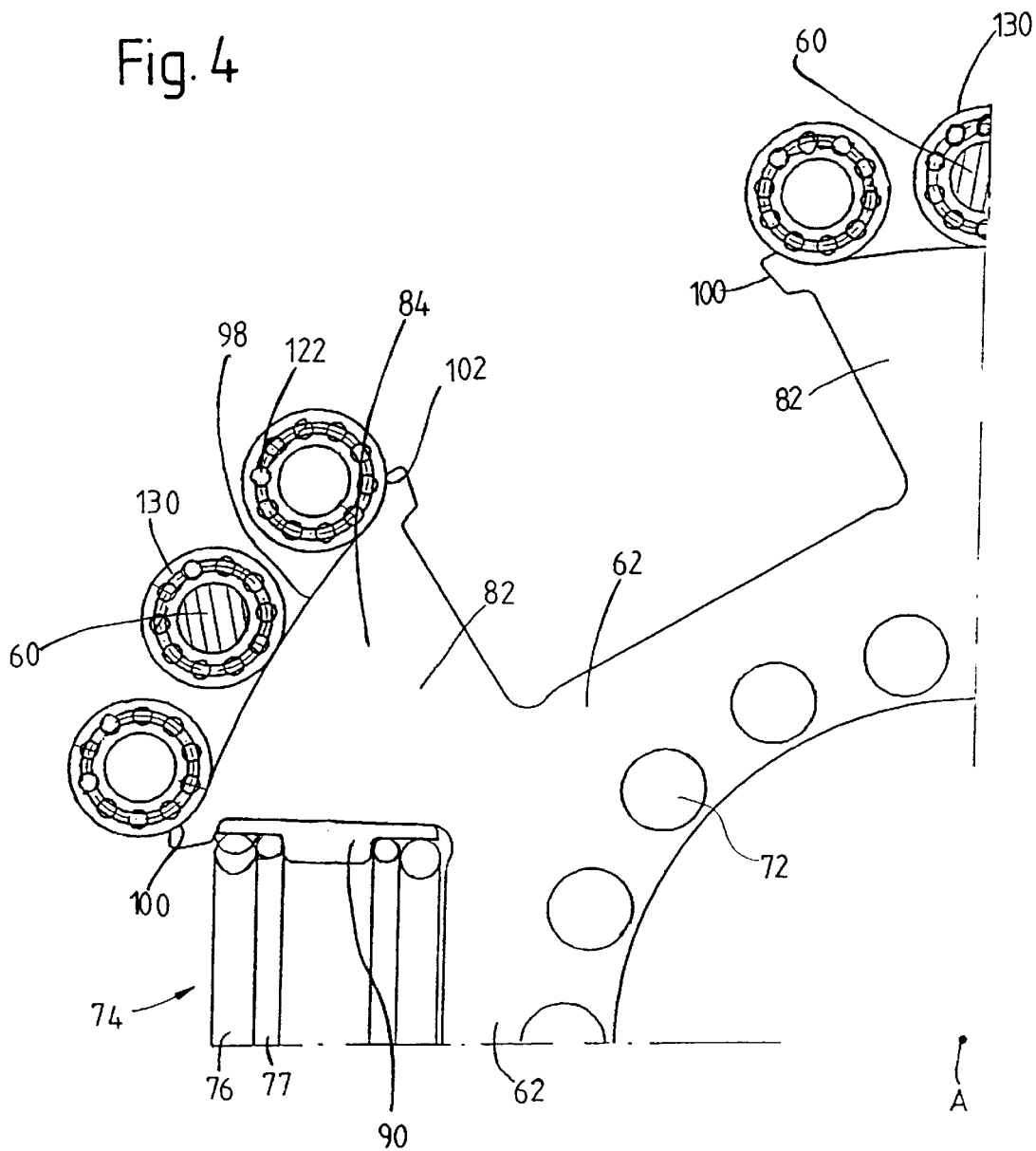
FIG. 4 is a partial axial view of a part of the torsional vibration damper shown in FIG. 3.

Another embodiment of a torsional vibration damper 10 according to the present invention is shown in FIGS. 3 and 4. In this embodiment, the radial bearing arrangement 92 does not comprise the sliding bearing sleeves mentioned and shown above. Rather, the radial bearing arrangement 92 in FIGS. 3 and 4 comprises rolling bodies 122, e.g., balls, which are arranged to roll between a rolling body path 124 of an inner bearing ring 126 and a rolling body path 128 of an outer bearing ring 130. The inner bearing ring 126 is supported on the portion 96 of the connection bolt 60. The outer bearing ring 130 is located, as can be seen in FIG. 4, with its outer circumferential surface on a respective bearing surface 98 of the central disk element 62. This means that the outer bearing ring 130 is a bearing roller element in this embodiment form.

The central disk element 64 has no connection areas connecting the supporting arms 84 as shown in FIG. 4. The stop portions 100, 102 are formed by projections which project in circumferential and radial direction and which also have the additional function of securing the damper element arrangement 74 and the springs 76, 77 in their supporting areas to prevent movement radially outward.

It is further noted that the sliding bearing rings 66, 68 may be fixed to the cover disk elements 56 and 58 or to the central disk element 62 by riveting, gluing or other connecting means as shown in FIG. 3. Further, as was described above with reference to the embodiment form in FIGS. 1 and 2, the torsional vibration damper shown in FIGS. 3 and 4 may, of course, be integrated in a hydrodynamic clutch device such as, for example, the torque converter shown in FIG. 1 or a fluid coupling.

Figure 5:
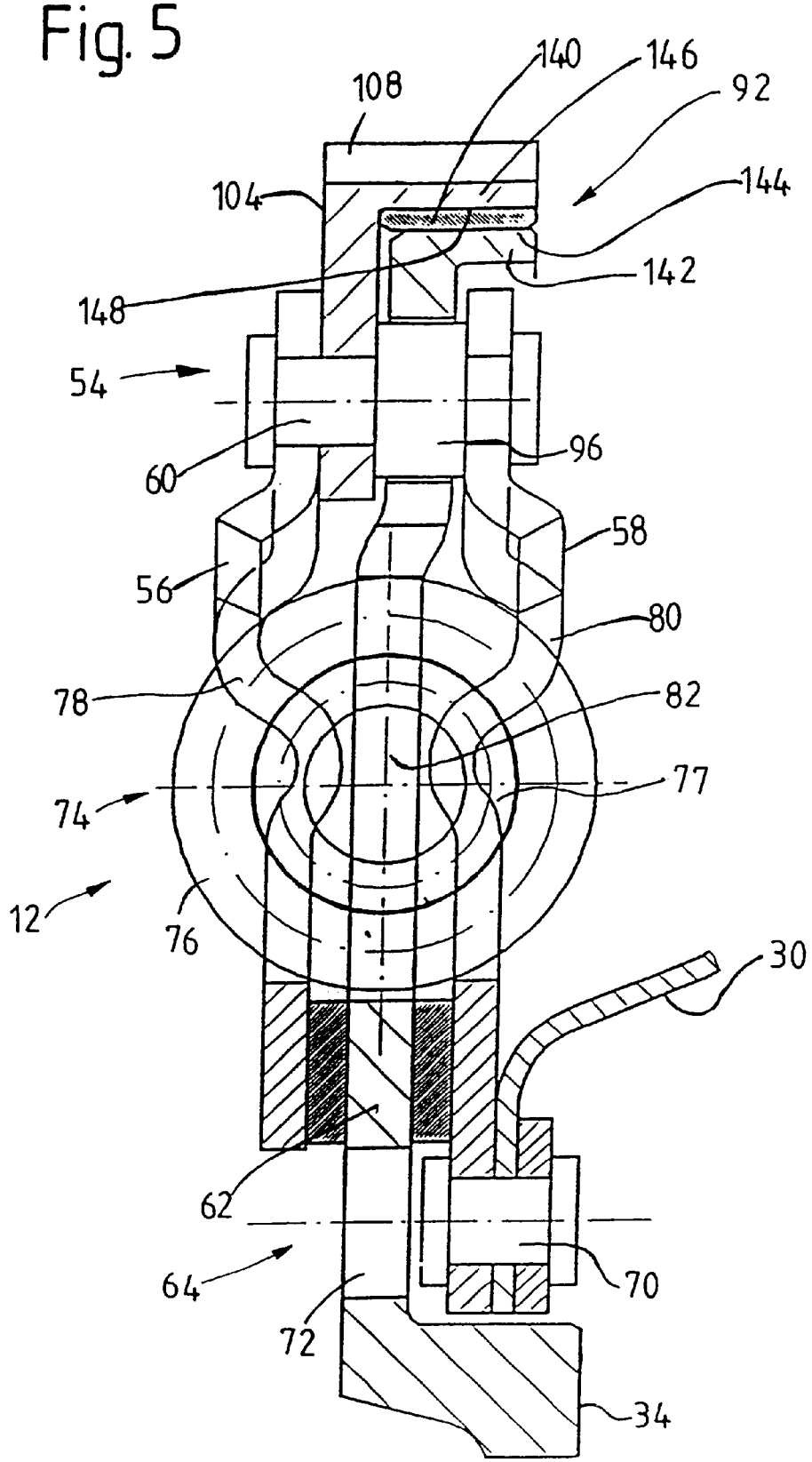
FIG. 5 is a partial longitudinal sectional view of another embodiment of a torsional vibration damper according to the present invention.

Another embodiment of the torsional vibration damper is shown in FIGS. 5 and 6. In this embodiment, the radial bearing arrangement 92 encloses a sliding bearing sleeve 140 which is concentric to the axis of rotation A and accordingly has an annular shape. A cylindrical portion 142 is arranged in a radial outer area of the central disk element 92. The sliding bearing sleeve 140 contacts an outer circumferential surface 144 of the cylindrical portion 142. The inner plate carrier 104, as described above, is held to the cover disk elements 56, 58 by the connection bolt 60 and accordingly forms a structural component part of the primary side 54. The inner plate carrier 104 has an inner circumferential surface 148 in the portion 146 which is also constructed cylindrically. The radial outer side of the sliding bearing sleeve 140 is supported at the inner circumferential surface 148. To provide a uniform bearing support, the two cylindrical portions 142, 146 are constructed to be continuous in the circumferential direction. Accordingly, the cylindrical portion 142 of the central disk element 62 is also present in the connection portions 88 located between two supporting areas 82 of the central disk element 62. Each connection portion 88 may have, in part, a circumferential recess 150 which is again limited at its two circumferential ends by stop portions 100, 102. The connection bolt 60 engaging in these circumferential recesses 150 may have a portion 96 with a greater diameter which contacts these stop portions 100, 102 in circumferential direction to limit the angle of rotation between the primary side 54 and the secondary side 64.

Of course, the different constructional embodiments of the types described above may be combined. For instance, bearing roller elements which are mounted so as to be rotatable via rolling bodies, for example, the balls 122 described above, and bearing roller elements which are mounted so as to be rotatable via sliding bearings may be distributed on the torsional vibration damper in the circumferential direction. Each of these constructional embodiments may also be combined in addition with the sliding bearing sleeve which surrounds the axis of rotation A concentrically and which is shown in FIGS. 5 and 6. Finally, each of the constructional embodiments described above, by itself or in combination with another constructional embodiment, offers the substantial advantage that the bearing support is shifted into a radial outer region with the result that the loading of the components use for the bearing support is reduced and with the result that the turbine wheel shell, in particular, may be constructed in conventional manner.

A torsional vibration damper of the type described above may also be used in torque converters or hydrodynamic clutch devices which are constructed differently, especially in a differently constructed lockup clutch arrangement. Only in the embodiment form according to FIGS. 5 and 6 requires a radial supporting surface for supporting the sliding bearing sleeve, for example, by means of a structural component part which essentially corresponds to the inner plate carrier with respect to its configuration and which could be formed, for example, by a portion of the cover disk element 56 which is lengthened radially outward.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A torsional vibration damper for a hydrodynamic clutch device having a turbine wheel hub, a turbine wheel shell and a lockup clutch arrangement, comprising:

a primary side and a secondary side rotatable about an axis of rotation relative to said primary side;

a damper element arrangement arranged circumferentially between said primary side and said secondary side such that said secondary side is rotatable relative to said primary side against an action of said damper element arrangement;

a radial bearing arrangement operatively arranged between said primary side and said secondary side for radially supporting said primary side and said secondary side relative to one another, wherein said radial bearing arrangement is arranged radially outside of said damper element arrangement such that a radial distance between said radial bearing arrangement and said axis of rotation is greater than a radial distance between said damper element arrangement and said axis of rotation, and wherein said radial bearing arrangement is rotatably arranged at one side of said primary side and said secondary side and comprises a plurality of bearing roller elements, wherein the other side of said Primary side and said secondary side comprises a bearing surface on which said bearing roller elements are movably arranged; and at least one bearing body arranged on said one side of said primary side and said secondary side, wherein at least one bearing roller element of said plurality of bearing roller elements is rotatably mounted relative to said one side of said primary side and said secondary side via said at least one bearing body, wherein said at least one bearing body comprises a sliding bearing body and said one side of said primary side and said secondary side comprises a bearing journal and said sliding bearing body comprises a sliding bearing sleeve supported at said bearing journal and wherein said at least one bearing roller element is supported on said sliding bearing sleeve.

2. The torsional vibration damper of claim 1, wherein said plurality of bearing roller elements comprises a plurality of sliding bearing elements and the other side of said primary side and said secondary side has a bearing surface on which said plurality of sliding bearing elements are movably arranged.

3. The torsional vibration damper of claim 1, wherein a circumferential stop portion is arranged on at least one circumferential side of said bearing surface.

4. The torsional vibration damper of claim 1, further comprising a supporting area for said damper element arrangement at the other side of said primary side and said secondary side and said bearing surface is arranged at a radial outer region of said supporting area.

5. The torsional vibration damper of claim 1, wherein said primary side comprises two cover disk elements arranged at an axial distance from one another and fixedly connected with one another and said secondary side comprises a central disk element arranged between said two cover disks.

6. The torsional vibration damper of claim 5, further comprising a connection element connecting said two cover disks, wherein said connection element comprises said bearing journal.

7. The torsional vibration damper according to claim 6, further comprising the hydrodynamic torque converter, wherein said lockup clutch arrangement comprises a clutch element connected with said primary side, wherein said clutch element is connected at said primary side via said connection element.

8. The torsional vibration damper of claim 5, further comprising the turbine wheel shell of the hydrodynamic clutch device, wherein a radial inner region of one of said cover disk elements is connected to said turbine wheel shell.

9. The torsional vibration damper of claim 5, further comprising the turbine wheel hub of the hydrodynamic clutch device, wherein said central disk element is integrally connected with said turbine wheel hub.

10. The torsional vibration damper of claim 5, further comprising the lockup clutch arrangement of the hydrodynamic torque converter, wherein said lockup clutch arrangement comprises a clutch element connected with said primary side.

11. The torsional vibration damper of claim 10, wherein said clutch element comprises a plate carrier.

12. A The torsional vibration damper for a hydrodynamic clutch device having a turbine wheel hub, a turbine wheel shell and a lockup clutch arrangement, comprising:

a primary side and a secondary side rotatable about an axis of rotation relative to said primary side;

a damper element arrangement arranged circumferentially between said primary side and said secondary side such that said secondary side is rotatable relative to said primary side against an action of said damper element arrangement;

a radial bearing arrangement operatively arranged between said primary side and said secondary side for radially supporting said primary side and said secondary side relative to one another, wherein said radial bearing arrangement is arranged radially outside of said damper element arrangement such that a radial distance between said radial bearing arrangement and said axis of rotation is greater than a radial distance between said damper element arrangement and said axis of rotation, and wherein said radial bearing arrangement is rotatably arranged at one side of said primary side and said secondary side and comprises a plurality of bearing roller elements, wherein the other side of said primary side and said secondary side comprises a bearing surface on which said bearing roller elements are movably arranged; and at least one bearing body arranged on said one side of said primary side and said secondary side, wherein at least one bearing roller element of said plurality of bearing roller elements is rotatably mounted relative to said one side of said primary side and said secondary side via said at least one bearing body, wherein said one side of said primary side and said secondary side comprises a bearing journal and wherein said radial bearing arrangement comprises a plurality of rolling bodies arranged between said bearing journal and said at least one bearing roller element so that said at least one bearing roller element is mounted at said bearing journal via said plurality of rolling bodies.

13. The torsional vibration damper of claim 12, wherein said primary side comprises two cover disk elements arranged at an axial distance from one another and fixedly connected with one another and said secondary side comprises a central disk element arranged between said two cover disks.

14. The torsional vibration damper of claim 13, further comprising a connection element connecting said two cover disks, wherein said connection element comprises said bearing journal.

15. The torsional vibration damper according to claim 14, further comprising the hydrodynamic torque converter, wherein said lockup clutch arrangement comprises a clutch element connected with said primary side, wherein said clutch element is connected at said primary side via said connection element.

16. The torsional vibration damper of claim 14, wherein said bearing member is arranged radially outside of said connection element.

17. The torsional vibration damper of claim 13, further comprising the turbine wheel shell of the hydrodynamic clutch device, wherein a radial inner region of one of said cover disk elements is connected to said turbine wheel shell.

18. The torsional vibration damper of claim 13, further comprising the turbine wheel hub of the hydrodynamic clutch device, wherein said central disk element is integrally connected with said turbine wheel hub.

19. The torsional vibration damper of claim 13, further comprising the lockup clutch arrangement of the hydrodynamic torque converter, wherein said lockup clutch arrangement comprises a clutch element connected with said primary side.

20. The torsional vibration damper of claim 19, wherein said clutch element comprises a plate carrier.

21. The torsional vibration damper of claim 12, wherein a circumferential stop portion is arranged on at least one circumferential side of said bearing surface.

22. The torsional vibration damper of claim 12, further comprising a supporting area for said damper element arrangement at the other side of said primary side and said secondary side and said bearing surface is arranged at a radial outer region of said supporting area.

23. A hydrodynamic clutch device comprising a torsional vibration damper, said torsional vibration damper comprising:

a primary side and a secondary side rotatable about an axis of rotation relative to said primary side;

a damper element arrangement arranged circumferentially between said primary side and said secondary side such that said secondary side is rotatable relative to said primary side against an action of said damper element arrangement;

a radial bearing arrangement operatively arranged between said primary side and said secondary side for radially supporting said primary side and said secondary side relative to one another, wherein said radial bearing arrangement is arranged radially outside of said damper element arrangement such that a radial distance between said radial bearing arrangement and aid axis of rotation is greater than a radial distance between said damper element arrangement and said axis of rotation, and wherein said radial bearing arrangement is rotatably arranged at one side of said primary side and said secondary side and comprises a plurality of bearing roller elements, wherein the other side of said primary side and said secondary side comprises a bearing surface on which said bearing roller elements are movably arranged; and at least one bearing body arranged on said one side of said primary side and said secondary side, wherein at least one bearing roller element of said plurality of bearing roller elements is rotatably mounted relative to said one side of said primary side and said secondary side via said at least one bearing body, wherein said at least one bearing body comprises a sliding bearing body and said one side of said primary side and said secondary side comprises a bearing journal and said sliding bearing body comprises a sliding bearing sleeve supported at said bearing journal and wherein said at least one bearing roller element is supported on said sliding bearing sleeve.

24. A hydrodynamic clutch device comprising a torsional vibration damper, said torsional vibration damper comprising:

a primary side and a secondary side rotatable about an axis of rotation relative to said primary side;

a damper element arrangement arranged circumferentially between said primary side and said secondary side such that said secondary side is rotatable relative to said primary side against an action of said damper element arrangement;

a radial bearing arrangement operatively arranged between said primary side and said secondary side for radially supporting said primary side and said secondary side relative to one another, wherein said radial bearing arrangement is arranged radially outside of said damper element arrangement such that a radial distance between said radial bearing arrangement and said axis of rotation is greater than a radial distance between said damper element arrangement and said axis of rotation, and wherein said radial bearing arrangement is rotatably arranged at one side of said primary side and said secondary side and comprises a plurality of bearing roller elements, wherein the other side of said primary side and said secondary side comprises a bearing surface on which said bearing roller elements are movably arranged; and at least one bearing body arranged on said one side of said primary side and said secondary side, wherein at least one bearing roller element of said plurality of bearing roller elements is rotatably mounted relative to said one side of said primary side and said secondary side via said at least one bearing body, wherein said one side of said primary side and said secondary side comprises a bearing journal and wherein said radial bearing arrangement comprises a plurality of rolling bodies arranged between said bearing journal and said at least one bearing roller element so that said at least one bearing roller element is mounted at said bearing journal via said plurality of rolling bodies.

\* \* \* \* \*